(12) United States Patent
Pham et al.

(10) Patent No.: US 9,081,811 B2
(45) Date of Patent: Jul. 14, 2015

(54) METHOD OF MATCHING DATA AND USE IN THE VERIFICATION OF IDENTITY OF A RECIPIENT OF A MAIL

(75) Inventors: Minh-Viet Pham, Paris (FR); Vincent Michelot, Dampierre en Yvelines (FR); Cecile Delbecq, Carrieres sur Seine (FR); Thibault Lamaury, Boulogne-Billancourt (FR); Benoit Ducarne, Plaisir (FR)

(73) Assignee: LA POSTE, Paris Cedex (FR)

(*) Notice: Subject to any disclaimer, the term of this patent is extended or adjusted under 35 U.S.C. 154(b) by 0 days.

(21) Appl. No.: 13/559,889

(22) Filed: Jul. 27, 2012

(65) Prior Publication Data
US 2013/0110855 A1    May 2, 2013

(30) Foreign Application Priority Data

Jul. 27, 2011 (FR) ...................... 11 56842

(51) Int. Cl.
G06F 7/00 (2006.01)
G06F 17/30 (2006.01)
G06F 17/27 (2006.01)
H04L 12/58 (2006.01)
G06Q 10/10 (2012.01)

(52) U.S. Cl.
CPC ...... G06F 17/30386 (2013.01); G06F 17/2775 (2013.01); G06Q 10/107 (2013.01); H04L 51/34 (2013.01)

(58) Field of Classification Search
CPC .................................. G06F 17/2775
USPC ........................................... 707/758
See application file for complete search history.

(56) References Cited

U.S. PATENT DOCUMENTS

| 2005/0012521 A1* | 1/2005 | Sharangpani et al. .......... 326/46 |
| 2007/0156826 A1 | 7/2007 | Lu |
| 2010/0106786 A1 | 4/2010 | Horstmann et al. |
| 2011/0154474 A1 | 6/2011 | Siegel et al. |

FOREIGN PATENT DOCUMENTS

WO     WO 2008031167 A1 *  3/2008

OTHER PUBLICATIONS

French Search Report and Written Opinion dated Jan. 20, 2012.

* cited by examiner

*Primary Examiner* — Apu Mofiz
*Assistant Examiner* — Ajith Jacob
(74) *Attorney, Agent, or Firm* — Bachman & LaPointe, P.C.

(57) ABSTRACT

A method of matching identification data comprising: acquisition of a data record comprising a plurality of fields; selection of matched records stored in a database, the data records having fields of type corresponding to the fields of the record acquired, the selection comprising for each record of the database: comparison of at least one field with the corresponding field of the record acquired, the comparison defining a discrete metric with at least three states of which a first state corresponds to an identity; and search for the match by traversal of a finite automaton in which each transition corresponds to at least one state of the comparison metric for at least one field, the finite automaton having at least two final states: matched and unmatched.

10 Claims, 2 Drawing Sheets

METHOD OF MATCHING DATA AND USE IN THE VERIFICATION OF IDENTITY OF A RECIPIENT OF A MAIL

BACKGROUND

The present invention relates in a general manner to the automatic matching of identification data.

In a particular manner, the present invention is aimed at proposing a method of matching data and its use in the verification of identity intended to be implemented within the framework of an electronic registered letter dispatch service.

The development of an electronic registered letter service has brought about a new requirement relating to the verification of the identity of a recipient. The need has arisen to provide a method for verifying such an identity at the time that the letter is dispatched.

However, the use of an automatic method for managing such a service involves new problems regarding the search for and automatic validation of the recipient or recipients of such an electronic registered letter, in particular when the identification fields filled in by the sender do not coincide perfectly with the identification fields contained in the databases pertaining to the recipient or recipients.

The need thus arises to solve the problem of matching data even when the latter are not perfectly identical.

SUMMARY OF THE INVENTION

Thus, the invention relates to a method of matching identification data comprising:
  acquisition of a data record comprising a plurality of fields;
  selection of matched records stored in a database, the data records having fields of type corresponding to the fields of the record acquired, the selection comprising for each record of the database:
  comparison of at least one field with the corresponding field of the record acquired, the comparison defining a discrete metric with at least three states of which a first state corresponds to an identity;
  search for the match by traversal of a finite automaton in which each transition corresponds to at least one state of the comparison metric for at least one field, the finite automaton having at least two final states: matched and unmatched.

Thus, in a method according to the invention, data relating to the identity of a recipient are compared with prerecorded data, so as to determine whether the recipient has a digital identity recorded in a database. A digital identity can consist of a Post Office verified digital identity IDN that can be used within the framework of the electronic registered letter service, but can also consist of a digital identity supplied by another provider and recorded in an external database.

On completion of the implementation of the method, it is thus determined whether or not the possible recipient of an electronic registered letter has a digital identity. In the case where the recipient possesses such an identity, the user of the electronic registered letter service, also called the sender, is informed of this positive result, and can thus continue with the dispatching of the electronic registered letter.

Advantageously, the use of a finite automaton to decide the matching makes it possible to determine a match even if all the fields are not perfectly identical between the data supplied by the sender and those contained in the database.

On the other hand, in the case where the recipient does not possess any digital identity, several choices for continuing his dispatch can be proposed to the sender, according to the various embodiments of the service. Thus, in an example, the sender will be able to choose to pass to the dispatch of a conventional registered letter or via an electronic registered letter followed by a paper printout, or will be able to choose to proceed with fully electronic dispatch despite the negative result of the method of verifying the recipient's digital identity.

It should be noted that, in the foregoing, the expression "name of the recipient" can cover the set of elements making up the identity of a natural person, for example their title, their surname and their forename, or else the corporate name of a legal entity.

Furthermore, the expression "physical address" corresponds, for example, to a postal address or a geographical address.

Within the framework of the implementation of the method, it is possible for the search for a digital identity to be performed in a plurality of databases, possibly leading to multiple positive results on completion of the comparisons.

Thus, in particular embodiments of the invention, useful alone or in combination:
  when several stored records are defined as matched, the verification that the result of the comparison of a predetermined field is the first state;
  the discrete metric comprises 3 states: in addition to the first state corresponding to an identity, a second state corresponding to a minor difference and a third state corresponding to a major difference;
  the records comprise the following fields: a first identification parameter corresponding to an electronic address of the person, a second identification parameter corresponding to the name of the person and a third parameter corresponding to a physical address of the person;
  when the result of the search for a match corresponds to:
    a single record, determination that the match is positive;
    no record, determination that the match is negative;
    a plurality of record, determination that the match is positive if these records comprise an identical electronic address;
  the values of the metric are included
    for the first identification parameter, in the group comprising: first and second states,
    for the second parameter, in the group comprising: first, second and third states,
    for the third parameter, in the group comprising first and third states
  when a first parameter has been provided, finite automaton comprises the following steps:
    when the state of the metric of the first parameter with the corresponding parameter of the record is the first state
      if the state of the metric of the second parameter with the corresponding parameter of the record is the first state, determination that the record corresponds to the person,
      if the state of the metric of the second parameter is the second state, determination that the record corresponds to the person,
      if the state of the metric of the second parameter is the third state, determination that the record does not correspond to the person;
    when the state of the metric of the first parameter is the third state, determination that the record does not correspond to the person;

when a first parameter has not been provided, the decision algorithm comprises the following steps:
  determination that a record of the database corresponds to the person in the following two cases: a first or second state for the second parameter and a first state for the third parameter,
  determination that no record corresponds in all other cases.
before the comparison step, of standardizing the data acquired according to a predetermined format. The standardization format employed is, in a preferential manner, the same as that employed by the providers of databases, so as to facilitate the comparison of the various parameters.

According to a second subject of the invention, a method of verifying the identity of a recipient of an electronic registered mail comprises a sub-method of matching, as described hereinabove, the data describing the recipient of the mail.

In a particular embodiment, the matching is carried out with the records of a database of recipients, the records having been validated beforehand as authentication values, so as to determine whether or not the data describing the recipient correspond to an authenticated recipient.

BRIEF DESCRIPTION OF THE DRAWINGS

Other advantages and particular features of the present invention will result from the description which follows, given by way of nonlimiting example and with reference to FIG. 1 is a diagram of a system making it possible to carry out matching according to one embodiment of the invention.

DETAILED DESCRIPTION OF THE PREFERRED EMBODIMENT(S)

Figure 1:
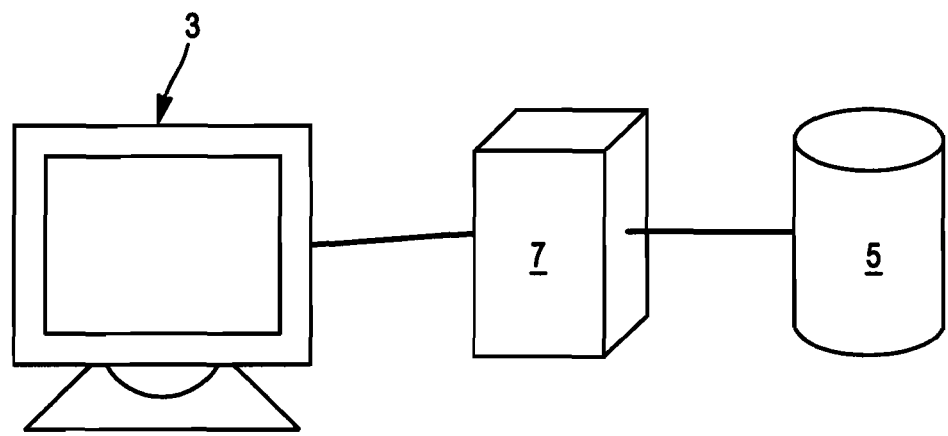

With reference to FIG. 1, a matching system 1 comprises a device 3 for acquiring a record comprising several fields, these terms being used in their customary sense with reference to relational databases.

Moreover, a database 5 comprises a plurality of records comprising the same types of fields. Thus typically, the records will be held in a table of the database 5.

The acquisition device 3 and the database 5 are connected to a matching device 7, typically a logic and arithmetic computation unit or a computer.

Figure 2:
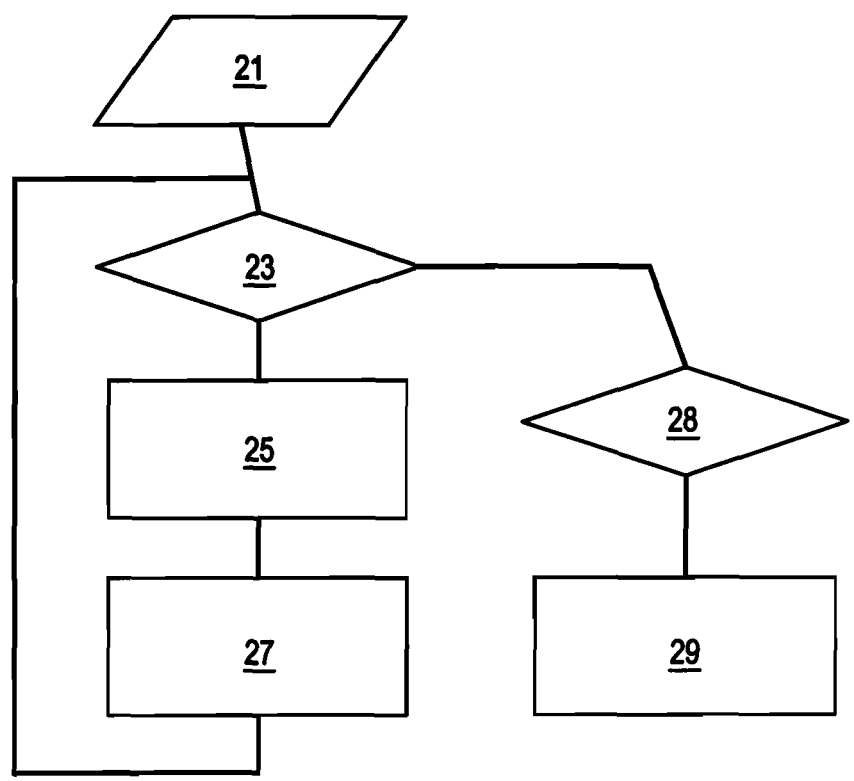
FIG. 2 is a flowchart of the matching method according to one embodiment of the invention.

The operation of the matching device 1 is now explained in conjunction with FIG. 2.

By way of the acquisition device 3, a data record comprising a plurality of fields is input, step 21, so as to be compared with the records of the database and to detect identical or almost identical records.

As already indicated, the record acquired like the records of the database comprise fields of the same type which will be compared one by one. For example, for a data record of a person, there is a "surname-forename" field, a "postal address" field and an "email address" field.

The method loops, step 23, over the records of the database so as to compare them one after another with the record acquired.

In step 25, a comparison of at least one field with the corresponding field of the record acquired is carried out. The particular feature of this comparison is that it does not give a binary result: identical/different, but that a discrete metric is defined with at least three states wherein a first state corresponds to the identity, or identical state, a second state corresponds to minor differences and a third state corresponds to major differences, it being possible for this third state to be considered akin to the "different" state of a conventional comparison.

The notions of minor and major differences are predefined as a function of the result sought and of the type of data processed. For example, on a "surname-forename" field, it may be decided that the reversal "forename-surname" is a minor difference with respect to "surname-forename" but that a different forename is a major difference.

The result of the comparisons for each field having been obtained, a finite automaton is traversed, step 27. Each transition of the finite automaton corresponds to at least one state of the comparison metric for at least one field, the finite automaton having at least two final states: matched and unmatched. An exemplary finite automaton is described hereinafter in conjunction with the matching of individual identification data in a letter delivery context.

When the set of records of the database have been reviewed, 3 situations are possible: no record is considered to be matched, a single record is considered to be matched or several records are considered to be matched, step 28.

In this third case, a verification is carried out, step 29, on the state of comparison of a particular field and only the records for which the state of this field corresponds to the identical state are considered to be matched. For example, only the records having strictly the same email address are considered to be matched.

Figure 3:
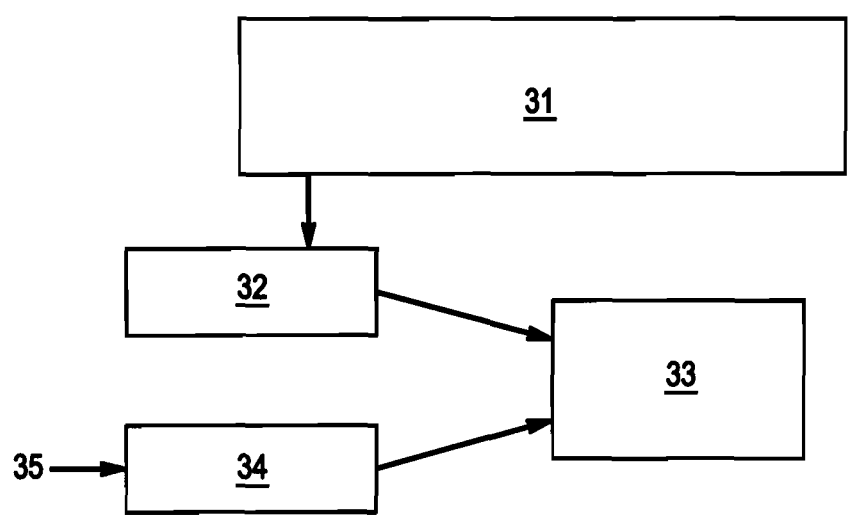
FIG. 3 is an exemplary architecture allowing the implementation of a method according to a second embodiment of the invention.

With reference to FIG. 3, this architecture shows a first component 31, corresponding to an identification service, making it possible to effect the interface between a user of the electronic registered letter service and the system implementing the recipient identity verification method. By way of this interface, a user who wishes to dispatch an electronic registered letter provides the system with the recipient's identification data.

These data comprise, for example, a surname, a mail address, a physical address or any other element of their identity.

In a particular example, the interface is designed in such a way that the user inputs the data into predetermined fields. The data provided by the user are then standardized by the component 32, which is a standardization component.

The principle of this component consists in modifying, if required, the data entered by the user, so as to record them in a standardized form making it possible to perform the subsequent comparisons in a relevant manner.

These modifications are performed using predetermined standardization rules, such as those indicated hereinafter:
  The words which appear in a list of abbreviations are replaced with their translations, also recorded in the list of abbreviations: this list is parametrizable by the provider of the identity verification service. It comprises, for example, terms such as "Ms", "Mrs", etc.
  The lowercase characters of a word are converted to uppercase,
  All the accents are removed, and certain characters with accents are replaced with their equivalents without accents, and
  Multiple spaces are removed and replaced with single spaces.

On completion of the standardization, the data are, for example, in the form of a list of fields, such as defined hereinafter:

an "electronic address" field
a field SNA_1 comprising the forename and the surname of the user,
fields SNA_2 to SNA_7 comprising the various elements of the user's physical, postal or geographical address: "Apartment No.", "Building No.", "No. and name of street", "Locality or post box", "Post code", "Town", "Country code".

In an advantageous embodiment of the invention, the elements of the databases with which the comparisons will be performed, and which will be described subsequently, are standardized beforehand using the same standardization rules.

Thereafter in the method for verifying the identity of the recipient, the data in standardized form are then provided to a component 33 for implementing the decision algorithm.

This component 33 consults, in parallel, a component 34 for accessing a recipients database, to search for whether a digital identity corresponding to the recipient exists.

According to the embodiments, the component 34 for accessing a database is itself able to consult external databases, or it is fed via external data streams 35.

A recipients database is, for example, fed via a verified Digital Identity system from the Post Office, called an "IDN".

The IDN is presented here in combination with the present invention, but it should be noted that the process of issuing the IDN as well as all the related characteristics, may be implemented in a manner independent of the present invention and of its embodiments. Thus, the IDN system such as described subsequently allows an IDN user to have a verified digital identity, which may be used for identification purposes for services of any type.

Within the framework of an embodiment of a method according to the invention, the identity verification consists in verifying whether the possible recipient of an electronic registered letter is an IDN user, that is to say a user who has enrolled beforehand with the Post Office's IDN verified Digital Identity service.

The IDN system will now be described in an independent manner.

In an IDN system, the attributes of an IDN user relate, in particular, to:
account information (pseudonym, password),
the identity of the IDN user (title, surname, forename, date of birth),
a physical, postal or geographical address (road name, post code, town, country, etc.)
an electronic address,
a mobile telephone number.

The principle of the IDN system is that an IDN user declares information, which will be verified by the IDN device, and which will thereafter be able to be used without requiring a new verification on each use.

The implementation of an IDN process comprises, for example, the following steps:

1. A step of beginning the enrolment in the course of which an IDN user declares, via an interface of IDN Web site type, elements of his identity (title, surname, forename, date of birth, email address, postal address, mobile telephone number) and of a personal password;

2. A step in the course of which the IDN service dispatches an enrolment notification message to the electronic address declared by the IDN user; this message contains, in particular, a url link to a page making it possible to confirm the enrolment and therefore the IDN identifier of the user of the IDN service;

3. A step in the course of which the IDN user confirms the enrolment, for example by going to a Web site corresponding to the link provided in the message;

4. A step in the course of which the service dispatches an activation code by SMS to the mobile telephone number declared by the IDN user;

5. A step in the course of which the IDN user inputs, via the interface, the SMS code received, so that the existence and the validity of the mobile number that he has declared are verified and confirmed;

6. A step in the course of which the service dispatches, to the IDN user, an activation code by postal mail to the address that he has declared;

7. A step in the course of which the postal mail, or any means of issuing the activation code, is delivered to the residence, by hand, by an employee of the Post Office, or by any other means making it possible to verify the postal address of the recipient as well as the identity of the user of the IDN service;

8. A step in the course of which the IDN user inputs, via the interface, the activation code received by mail and delivered by hand, doing so in order to validate the physical address declared by the IDN user and to confirm the verification of the identity of the IDN user that he has declared;

8. A final step in the course of which the service confirms to the IDN user the creation of their personal IDN.

Thus, such an IDN service makes it possible to verify one by one the set, or a subset, of the data provided by the IDN user and in particular the identity that he has declared.

The user's data are stored in a secure manner.

These data are stored in a standardized form, as described in the following array:

| Attribute | Format | Size (unencrypted) | Meaning | Example (unencrypted) |
|---|---|---|---|---|
| id | Int not null auto_increment | 11 | Identification Number: ID technique BDD | 1 |
| login | String not null | varchar(50) | Login of the user (his email address) | "sdupont@nomail.fr" |
| password | Printout | varchar(100) | Printout of the password | |
| pseudo | String not null | varchar(32) | Pseudonym of the User | "sdt-007" |
| surname | Encrypted (Base 64) | varchar(50) | Surname of the user | "Dupont" |
| forename | Encrypted (Base 64) | varchar(50) | Forename of the user | "Stephane" |
| prefix | Encrypted (Base 64) | varchar(10) | Honorific prefix of the name of the subject | "Mr", "Mrs", "Ms" |
| birth_date | Date | | Date of birth | "01-04-2000" |

-continued

| Attribute | Format | Size (unencrypted) | Meaning | Example (unencrypted) |
|---|---|---|---|---|
| sna2 | Encrypted (Base 64) | varchar(38) | Address: Apartment, flat . . . | |
| sna3 | Encrypted (Base 64) | varchar(38) | Address: building, block | |
| sna4 | Encrypted (Base 64) | varchar(38) | Address: No. and name of the street | |
| sna5 | Encrypted (Base 64) | varchar(38) | Address: locality or post box | "Le Petit-Pont" |
| sna61 | Encrypted (Base 64) | varchar(5) | Address: post code | "35480" |
| sna62 | Encrypted (Base 64) | varchar(38) | Address: town | "Paris" |
| sna7 | Encrypted (Base 64) | varchar(2) | Address: country code in the ISO format.316631988-alpha2 | "FR" |
| mobile | Encrypted (Base 64) | varchar(10) | Mobile telephone number | "+33123381597" |
| email | Encrypted (Base 64) | varchar(50) | Mail address of the user | "sdupont@nomail.fr" |
| enrolment_date | Date not null | | Date of creation of account | |
| validation_date | Date | | Date of validation of account | |
| password_date | Date | | Date of last change of password | |
| sna_date | Date | | Date of last change in sna fields | |
| mobile_date | Date | | Date of last change of mobile | |
| email_date | Date | | Date of last change of electronic address | |

As previously mentioned, the data recorded in a database within the framework of an IDN service may be used by the component 34.

In other embodiments, the component 34 may be fed via all sorts of databases supplied by outside providers, such as databases of company certificates. In this case for example, the component 34 directly hosts certain information of the company certificates.

In all cases, namely hosting of the database directly at the level of the component 34, or remote hosting, the component 33 consults the data via the component 34, and uses these data to perform comparisons with the data supplied by the user of the electronic registered letter service to the component 31, after standardization by the component 32.

Thus, the component 33 applies an algorithm implementing a decision matrix, or finite automaton, to determine, as a function of the difference values determined, whether one or more elements, or records, of the user database corresponds or correspond to the user, thus defining a match between the data provided by the sender and a recipient when the correspondence exists.

Such a decision matrix takes for example, and without this matrix being exhaustive of the possible comparisons, the following form:

| Email difference | = | = | = | M | — | — | — | — | — | — | — | — |
| SNA1 difference | = | m | M | * | = | = | = | m | m | m | M | M | M |
| SNA2-7 difference | * | * | * | * | = | M | — | = | M | — | = | M | — |
| Identification | Y | Y | N | N | Y | N | N | Y | N | N | N | N | N |

The expression "email difference" corresponding to the comparison between an email address of a possible recipient, provided by a user of the electronic registered letter service, and email addresses recorded in recipient databases.

The same goes for the other parameters, which are compared one by one: comparison of the name (SNA_1 difference) and comparison of the physical address (fields SNA_2-7).

In the matrix hereinabove:
- the sign "=" represents a zero difference,
- the sign "m" represents a minor difference,
- the sign "M" represents a major difference,
- the sign "-" represents an absent datum,
- the sign "*" indicates that the value does not have any influence,
- the sign "Y" indicates that the element of the recipient database forming the subject of the comparison does actually correspond to the recipient, and
- the sign "N" indicates that the element does not correspond.

Thus, for example, the first column of the decision matrix corresponds to the following decision:
- the comparison between the emails culminates in a zero difference,
- the comparison between the names culminates in a zero difference,
- consequently, whatever the value of the physical address fields, it is determined that the compared element of the recipient database corresponds to the recipient.

The determination of the difference values is, for example, performed in the following manner:

1—The difference between the email fields may be Zero or Major:
- if the two email addresses are perfectly identical, the difference is "Zero"
- if the two email addresses are different, the difference is "Major"

2—The difference between the fields SNA_1 may be Zero, Minor or Major:
- if the elements contained in the two fields SNA_1 are perfectly identical, the difference is "Zero", if the elements contained in the two fields SNA_1 are identical but in a different order, which would correspond to a combination "Surname Forename" and a combination "Forename Surname", the difference is "Minor", if elements of the fields SNA_1 differ, but are present in the list of abbreviations, the difference is "minor", in other cases, the difference is "major".

3—The difference between the fields SNA_2-7 may be Zero, if the fields after standardization are identical, or Major if they differ after standardization.

Thus, after applying the decision algorithm, the component 3 determines whether elements of the database consulted via the component 4 correspond to the data provided by the user, and therefore to the possible recipient of the electronic registered letter.

Finally, in the case where the algorithm determines a unique element corresponding to the recipient, it is determined that the verification is positive, in the case where the algorithm does not determine any element corresponding to the recipient, it is determined that the verification of identity is negative, in the case where the decision algorithm determines a plurality of elements corresponding to the recipient, it is determined that the verification of identity is positive if these elements have an identical electronic address.

In the case where the identity verification is positive, the user of the electronic registered letter can continue dispatch to the recipient.

In the case where the identity verification is negative, various solutions may be proposed to the user of the registered letter service on-line.

Generally, the method described is intended to be implemented via an operating system comprising hosting servers and processors allowing the implementation of the various steps of the process.

All of these hosting, storage or operating hardware elements are maintained by the provider of the electronic registered letter service or by another service provider.

The invention has been illustrated and described in detail in the drawings and the description above. The latter must be considered to be illustrative and given by way of example and not as limiting the invention to this description alone. Numerous variant embodiments are possible.

In particular, the above description has split the method of identification into components of functional type. This splitting is modifiable in the implementation and, in particular, the set of functional components described may be grouped together in a single server or, conversely, be apportioned in a variable manner between several servers as a function of considerations such as loading, security of the system, etc. These apportionment operations come within the normal skills of system architects and engineers in charge of computerized systems.

In the same manner, these components may be duplicated.

For example, the component 33 for implementing the decision algorithm may be integrated into the IDN system so as to avoid the propagation over a network of the personal, and therefore confidential, data contained in the IDN.

Moreover, so as to simplify the description, the search for the records has been presented in the form of a loop reviewing all the records of the database one after the other. It is understood that the person skilled in the art can use the tools for optimizing databases at his disposal such as indices to obtain results more rapidly.

In the claims, the word "comprising" does not exclude other elements and the indefinite article "a/an" does not exclude a plurality.

The invention claimed is:

1. A method of matching identification data comprising:
acquisition of a data record comprising a plurality of fields;
selection of matched records stored in a database, the matched records having fields of type corresponding to fields of the acquired data record, the selection comprising for each record of the database:
comparison of at least one field with a corresponding field of the acquired data record, the comparison defining a discrete metric with at least three states of which a first state corresponds to an identity; and
search for a match by traversal of a finite automaton in which each transition corresponds to at least one state of the comparison metric for at least one field, the finite automaton having at least two final states: matched and unmatched;
wherein the discrete metric comprises 3 states, including the first state corresponding to an identity, a second state corresponding to a first level of differences between the compared fields, and a third state corresponding to a second level of differences between the compared fields, the second level of differences being distinct from the first level of differences, the first and second levels of differences being predefined as a function of the result sought and of the type of data processed.

2. The method as claimed in claim 1, which further comprises, when several stored records are defined as matched, verification that the result of the comparison of a predetermined field is the first state.

3. The method as claimed in claim 1, wherein each said record comprises the following fields: a first identification parameter corresponding to an electronic address of a person, a second identification parameter corresponding to a name of the person, and a third parameter corresponding to a physical address of the person.

4. The method as claimed in claim 3, wherein, the result of the search for a match corresponds to one of the following:
a single record, determination that the match is positive;
no record, determination that the match is negative;
a plurality of records, determination that the match is positive if said records comprise an identical electronic address.

5. The method as claimed in claim 3, wherein the values of the metric include:
for the first identification parameter, in the group comprising: first and second states,
for the second parameter, in the group comprising: first, second and third states,
for the third parameter, in the group comprising first and third states.

6. The method as claimed in claim 5, wherein when a first parameter has been provided, finite automaton comprises the following steps:
when the state of the metric of the first parameter with the corresponding parameter of the record is the first state
if the state of the metric of the second parameter with the corresponding parameter of the record is the first state, determination that the record corresponds to the person,
if the state of the metric of the second parameter is the second state, determination that the record corresponds to the person,
if the state of the metric of the second parameter is the third state, determination that the record does not correspond to the person;

when the state of the metric of the first parameter is the third state, determination that the record does not correspond to the person.

7. The method as claimed in claim 5, wherein when a first parameter has not been provided, the decision comprises the following steps:
   determination that a record of the database corresponds to the person in the following two cases: a first or second state for the second parameter and a first state for the third parameter,
   determination that no record corresponds in all other cases.

8. The method as claimed in claim 1, further comprising the step, before the comparison step, of standardizing the data acquired according to a predetermined format.

9. A method of verifying the identity of a recipient of an electronic registered mail, which comprises a sub-method of matching as claimed in claim 1 of the data describing the recipient of the mail.

10. The method as claimed in claim 9, wherein matching is carried out with the records of a database of recipients, said records having been validated beforehand as authentication values, so as to determine whether or not data describing the recipient correspond to an authenticated recipient.

* * * * *